(12) United States Patent
Kalhan et al.

(10) Patent No.: US 8,792,468 B2
(45) Date of Patent: Jul. 29, 2014

(54) SYSTEM AND METHOD FOR BROADCASTING OVERHEAD PARAMETERS IN POOR COVERAGE REGIONS

(75) Inventors: Amit Kalhan, La Jolla, CA (US); Henry Chang, San Diego, CA (US); Timothy Thome, Spring Valley, CA (US); Doug Dunn, Chula Vista, CA (US)

(73) Assignee: KYOCERA Corporation, Kyoto (JP)

( * ) Notice: Subject to any disclaimer, the term of this patent is extended or adjusted under 35 U.S.C. 154(b) by 2133 days.

(21) Appl. No.: 11/746,501

(22) Filed: May 9, 2007

(65) Prior Publication Data

US 2008/0279168 A1    Nov. 13, 2008

(51) Int. Cl.
*H04B 7/216*    (2006.01)

(52) U.S. Cl.
USPC .......................................... 370/342; 375/296

(58) Field of Classification Search
USPC .............................. 375/296; 370/338; 455/458
See application file for complete search history.

(56) References Cited

U.S. PATENT DOCUMENTS

| | | | |
|---|---|---|---|
| 5,577,087 A | 11/1996 | Furuya | |
| 5,991,286 A | 11/1999 | Labonte et al. | |
| 6,332,006 B1 | 12/2001 | Rydbeck et al. | |
| 6,393,295 B1 | 5/2002 | Butler et al. | |
| 6,944,460 B2 | 9/2005 | Haartsen | |
| 2003/0050070 A1 | 3/2003 | Mashinsky et al. | |
| 2003/0063579 A1 | 4/2003 | Lee | |
| 2005/0141475 A1* | 6/2005 | Vijayan et al. | 370/345 |
| 2005/0277429 A1 | 12/2005 | Laroia et al. | |
| 2007/0237121 A1* | 10/2007 | Khandelwal et al. | 370/338 |
| 2007/0254679 A1 | 11/2007 | Montojo et al. | |
| 2008/0268877 A1* | 10/2008 | Harris | 455/458 |
| 2008/0280630 A1 | 11/2008 | Kalhan et al. | |
| 2011/0019770 A1* | 1/2011 | Gorokhov et al. | 375/296 |

FOREIGN PATENT DOCUMENTS

| | | |
|---|---|---|
| JP | 2003-523658 | 8/2003 |
| JP | 2008-516487 A | 5/2008 |
| WO | WO 98/44753 | 10/1998 |
| WO | WO 2006/037386 A1 | 4/2006 |
| WO | WO 2007/127945 | 11/2007 |

* cited by examiner

*Primary Examiner* — Phuoc H Doan (57) ABSTRACT

To improve WWAN coverage, an access node broadcasts overhead messages on a first channel covering a first channel environment and a second channel covering a second channel environment within a coverage region. The overhead messages carry network overhead parameters for allowing wireless mobile devices to acquire and maintain traffic channels within the cellular system. The overhead message channels are configured so that a user perceives uninterrupted wireless services while moving through different channel environments in the coverage region. In one embodiment, the overhead message channels are separate physical channels configured with different broadcast parameters to provide coverage in different environments. In another embodiment, the overhead parameter information is segregated into base and extended components that are encoded and layer modulated onto separate logical channels. Using layered modulation, wireless mobile devices can receive base components in poor coverage regions. The base components include overhead parameters for acquiring a WWAN channel.

24 Claims, 7 Drawing Sheets

SYSTEM AND METHOD FOR BROADCASTING OVERHEAD PARAMETERS IN POOR COVERAGE REGIONS

RELATED APPLICATION

This application is related to U.S. patent application Ser. No. 11/746,532, filed May 9,2007, entitled "System and Method for Broadcasting Page Messages in Poor Coverage Regions", and assigned to the assignee of the present application, the disclosure of which is fully incorporated herein by reference in entirety.

TECHNICAL FIELD

The invention relates generally to wireless communications systems, and more specifically, to an improved method and system for broadcasting network overhead parameters to wireless mobile devices.

BACKGROUND

In recent years there has been an explosion of various wireless technologies such as WiFi (802.11), 3G (CDMA), WiMax (802.16) and many others. All of these technologies use different modulation schemes and access methods, such as code division multiple access (CDMA), orthogonal frequency division multiple access (OFDMA), or the like. To access network services using these different technologies, multi-mode mobile devices have been developed. Multi-mode devices are end-user devices configured to selectively interface to different wireless technologies. They allow users to connect to wireless communications networks irrespective of the underlying access technology.

Users of multi-mode wireless devices are mostly interested in network support for their particular applications, regardless of the underlying access technology. More importantly, users are interested in receiving uninterrupted services regardless of the access technology. Uninterrupted service is possible through a system design concept called seamless mobility. Seamless mobility provides the user with seamless access and connectivity across different wireless technologies and different wireless networks, such as wireless local area networks (WLANs), including WiFi networks, and wireless wide area networks (WWANs), such as cellular phone networks. Handoffs from WLAN to WWAN technologies should be transparent to the user, allowing a simplified, seamless mobile communications experience.

Although WWAN air interface technologies such as GSM, CDMA2000 and the like are designed to cover region surrounding their base stations (cells), not all areas within the intended coverage regions can receive WWAN service. These areas that lack coverage are typically known as coverage holes. WWAN coverage holes frequently occur inside buildings. To obtain wireless services within buildings or other coverage holes, multi-mode devices can often connect to a WLAN providing coverage within the building or WWAN coverage hole. However, in making a WLAN/WWAN handoff, multi-mode devices operating in some indoor environments experience dropouts, which interrupt their service. To provide true seamless mobility, multi-mode devices operating indoors or in other types of WWAN coverage holes should be able to transparently acquire uninterrupted WWAN services when departing from the coverage holes. Thus, there is a need to improve WWAN technology so that WWAN services can be seamlessly acquired by users experiencing poor or no coverage conditions.

SUMMARY

It is an advantage of the present invention to provide a system and method for broadcasting WWAN overhead information into WWAN coverage holes, where WWAN service is not available. The overhead information includes network parameters for allowing a wireless mobile device to acquire WWAN services. Having access to WWAN overhead information in WWAN coverage holes can facilitate seamless handoffs as a multi-mode device transitions from a WLAN to the WWAN, with no interruption of services to the user.

Other advantages of the invention will be or will become apparent to one with skill in the art upon examination of the following figures and detailed description. It is intended that all such additional advantages be included within this description, be within the scope of the invention, and be protected by the accompanying claims.

BRIEF DESCRIPTION OF THE DRAWINGS

It is to be understood that the drawings are solely for purpose of illustration and do not define the limits of the invention. Furthermore, the components in the figures are not necessarily to scale, emphasis instead being placed upon illustrating the principles of the invention. In the figures, like reference numerals designate corresponding parts throughout the different views.

DETAILED DESCRIPTION

The following detailed description, which references to and incorporates the drawings, describes and illustrates one or more specific embodiments of the invention. These embodiments, offered not to limit but only to exemplify and teach the invention, are shown and described in sufficient detail to enable those skilled in the art to practice the invention. Thus, where appropriate to avoid obscuring the invention, the description may omit certain information known to those of skill in the art.

Figure 1:
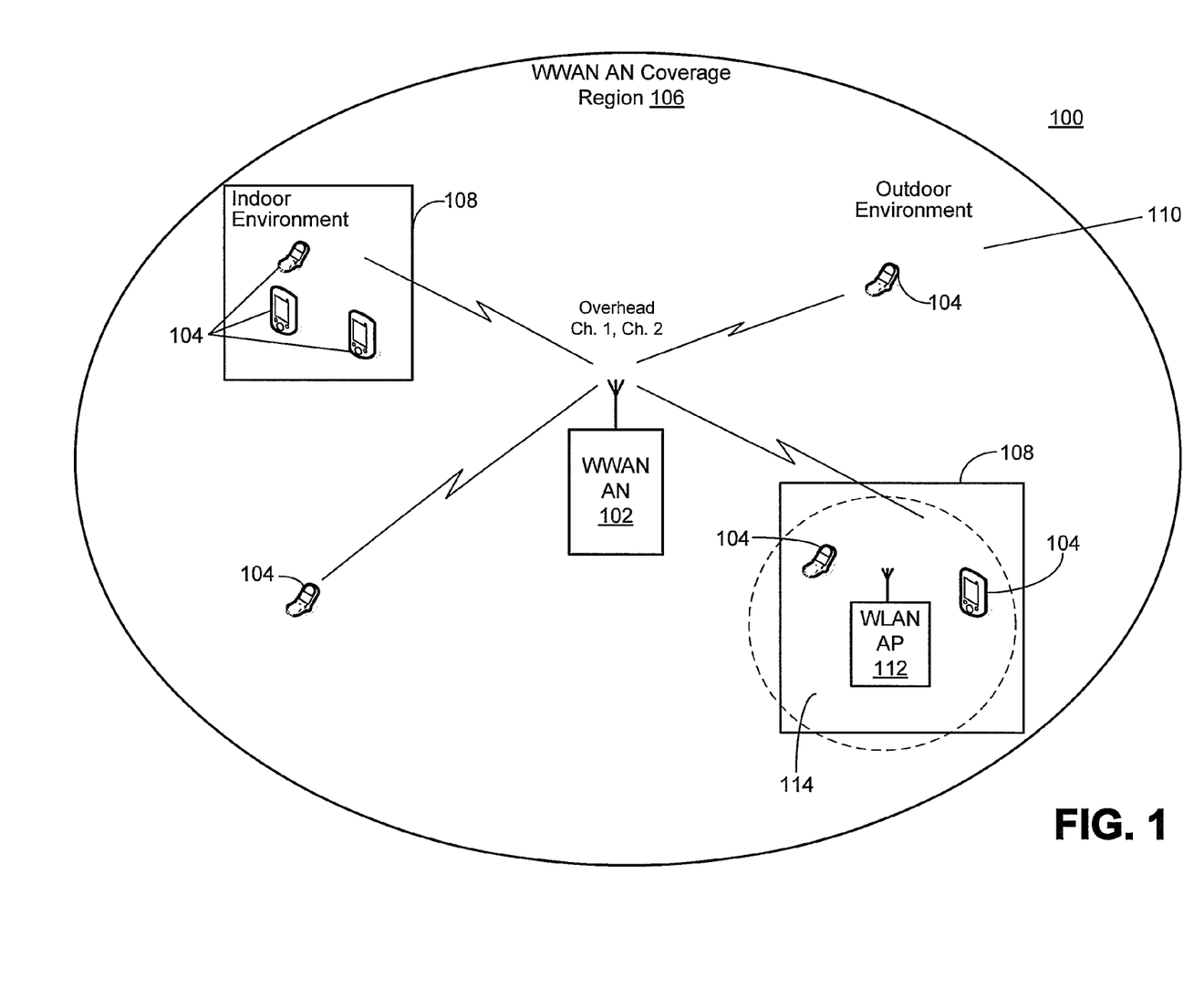
FIG. 1 is a conceptual diagram of wireless communications system in accordance with an exemplary embodiment of the present invention.

FIG. 1 is a conceptual diagram of wireless communications system 100 in accordance with an exemplary embodiment of the present invention. The wireless communications system 100 includes a wireless wide area network (WWAN) having a plurality of cells and one or more wireless local area networks (WLANs) within the coverage area of the WWAN.

To simplify the drawing, FIG. 1 shows only a single WWAN cell (WWAN coverage region 106) provided by a WWAN access node (AN) 102. In the example shown, the WWAN coverage region 106 overlays a single WLAN coverage area 114, which is provided by a WLAN access point (AP) 112. Additional WLAN coverage areas and APs could be present in the WWAN coverage region 106, but are omitted from FIG. 1 for simplicity.

One or more wireless mobile devices 104 (e.g., cellular phones, personal digital assistants (PDAs) or the like) are included in the communications system 100 and are capable of radio communications with the WWAN through AN 102. The wireless mobile devices 104 can include multi-mode wireless devices capable of radio communications with both the WWAN AN 102 and the WLAN AP 112. The wireless mobile devices 104 actively operating on the WLAN are capable of monitoring and receiving WWAN overhead information, as is described in further detail below.

The exemplary WWAN coverage region 106 contains three different types of radio channel environments: an indoor environment 108, an outdoor environment 110 and an outdoor-to-indoor environment. The indoor environment 108 is characterized by being located within a structure, such as a building. A structure may have permanent or temporary structures or elements, such as walls, within it. There may also be other objects as well. For example, a warehouse with no interior walls may be empty or it might be filled with cargo containers stacked to the ceiling. Some buildings and structures degrade or block radio signals. The outdoor environment is typically open space, that may contain natural and man made structures. The outdoor-to-indoor environment is present when a radio signal is transmitted from the outdoor environment 110 to the indoor environment 108. The outdoor-to-indoor environment is typically encountered when the WWAN AN 102 attempts to transmit to a wireless mobile device 104 that is located indoors within a building or other interfering structure.

In practice, these different channel environments occur in some WWAN coverage regions (cells). The presence of these different channel environments in a single coverage region can cause coverage holes. Principally, there are two causes of coverage holes: radio signal attenuation (including blocking) and fading. In addition, the different channel environments can also cause dropouts when a wireless mobile device 104 moves from the indoor WLAN coverage area 114, where it is receiving wireless services through the WLAN, to the outdoor environment 110, where there is a handoff from the WLAN to the WWAN.

To improve WWAN coverage, the WWAN AN 102 broadcasts overhead messages on a first channel (Overhead Ch. 1) covering a first channel environment (e.g., the outdoor environment 110) and a second channel (Overhead Ch. 2) covering a second channel environment (e.g., the indoor environment 108) within the WWAN coverage region 106. The overhead messages carry network overhead parameters for allowing the wireless mobile devices 104 to acquire and maintain WWAN traffic channels within the communications system 100. The overhead message channels are configured and accessed so that a user perceives uninterrupted wireless service while moving through the different channel environments in the WWAN coverage region 106.

By broadcasting network overhead parameters on two different channels, the WWAN AN 102 allows the wireless mobile devices 104 to stay "connected" to the outdoor WWAN AN 102, even while it is in indoor environments using the WLAN for data services. This solution is particularly advantageous where the WLAN and WWAN operate in different frequency bands using different operators and/or air interface technologies.

For purposes of the present disclosure, "connected" means that a wireless mobile device 104 can at least acquire the WWAN signal and demodulate the overhead messages containing network overhead parameters. Being "connected" does not necessarily require that the wireless mobile device 104 actively transmit data on a dedicated channel.

The WWAN is preferably a cellular network such as a CDMA2000, WCDMA, GSM, UTMS network or the like. The WWAN includes infrastructure comprising those network elements necessary to support wireless voice and data communications with the wireless mobile devices 104. The wireless communications infrastructure includes equipment such as controllers, transceivers and backhaul that establishes and maintains wireless communication with the wireless mobile devices 104, as well as other terminal devices. The types and amount of equipment within the wireless infrastructures depend on the particular wireless network. For example, a typical cellular network includes sector antennas connected to several base transceiver stations (BTSs) connected to base station controllers (BSCs) that are connected to a Mobile Switching Center (MSC). Cellular base station controllers are typically capable of communicating with an IP-based network, such as Internet, via a packet data server node (PDSN). Base stations are also capable of communicating with the public switched telephone network (PSTN) via the MSC. Thus, conventional cellular base stations included in the WWAN use the MSC and PSTN to provide conventional voice connections and telephony services between the wireless mobile devices 104 and other telephone devices over the WWAN. In addition, base stations of the WWAN use a PDSN and the Internet to provide packet data services, such as voice-over-IP (VoIP) and short messaging service (SMS), between the wireless mobile devices 104 and Internet protocol (IP) nodes communicating with the WWAN.

For seamless mobility of voice communication, VoIP may be provided by both the WLAN and WWAN. In this type of communications system, a WWAN AN may replace the BTS, and a PCF (Packet Call Function) could replace the BSCs in the WWAN. The PCF would connect directly to the PDSN.

In certain WWANs, an IP multimedia subsystem (IMS) serves as the core network. The IMS can support both the WWAN and WLAN to provide seamless handoffs between the two technologies. Specifically, the WLAN can be connected to the IMS via an IWF (interworking function), which is controlled by the cellular carrier.

In addition, in WWANs using Unlicensed Mobile Access (UMA) Technology, GSM and GPRS mobile services are available over WiFi. The WiFi network is connected to the cellular core network through the IP access network and a UMA network controller.

The WLAN is preferably a packet-based network, such as a WiFi network (e.g., IEEE-802.11a/b/g/n). The WLAN includes those network elements necessary to support data and voice communications with those wireless mobile devices 104 having multi-mode capabilities. For example, the WLAN may support voice-over-IP (VoIP) service over the WiFi connections.

Figure 2:
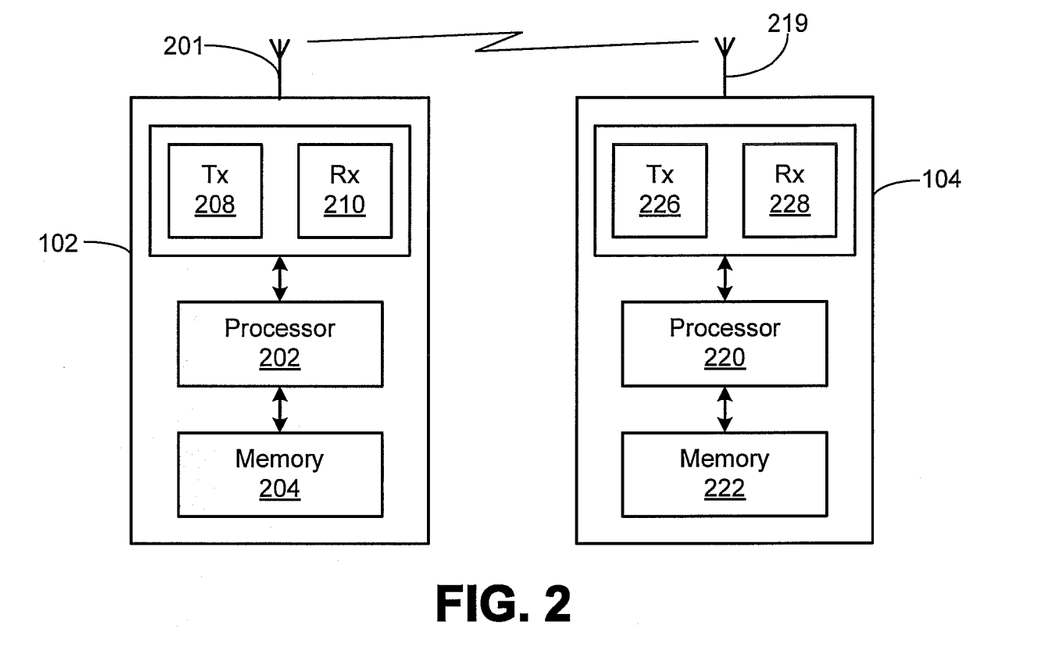
FIG. 2 is a block diagram illustrating details of the access node and a wireless mobile device included in the communications system of FIG. 1

FIG. 2 is a diagram illustrating general details of the WWAN AN 102 and one of the wireless mobile devices 104 included in the communications system 100 of FIG. 1. Although the present invention is not limited to any particular implementation of the WWAN AN 102, the WWAN AN 102 is preferably a cellular base station, as described above, that is connected to or includes one or more antennas 201, and includes a processor 202, a memory 204 and an air interface with a radio frequency transceiver 206 having a transmitter (Tx) 208 and a receiver (Rx) 210 for communicating with the wireless mobile devices 104. The processor 202 is configured to perform at least one the overhead message broadcast methods described herein, and may perform other baseband processing of digitized information. This processing typically comprises modulation and demodulation, encoding and decoding, interleaving and de-interleaving, multiplexing, error correction operations and the like. As such, the processor 202 is generally implemented in one or more digital signal processors (DSPs) and/or application specific integrated circuits (ASICs). The memory 204 stores one or more software programs executed by the processor 202 to perform its functions.

The AN 102 may be implemented with other architectures. For example, the transceiver 206 and/or antenna(s) 201 may be located outside of the AN 102, with the AN 102 connected thereto.

Each wireless mobile device 104 includes at least one antenna 219, a processor 220, a memory 222 and an air interface with radio frequency transceiver 224 having a transmitter (Tx) 226 and receiver (Rx) 228 for communicating with the WWAN AN 102. Those wireless mobile devices 104 having multi-mode capabilities also include an additional network interface and transceiver from communicating with the WLAN AP 112. The processor 220 is configured to extract overhead messages broadcasted by the WWAN AN 102 according to one or more of the broadcast methods described herein. The processor 220 may also perform other baseband processing of digitized information. This processing typically comprises modulation and demodulation, encoding and decoding, interleaving and de-interleaving, multiplexing and de-multiplexing, error correction operations and the like. As such, the processor 220 is generally implemented in one or more digital signal processors (DSPs) and/or application specific integrated circuits (ASICs). The memory 222 stores one or more software programs executed by the processor 220 to perform its functions.

Figure 3:
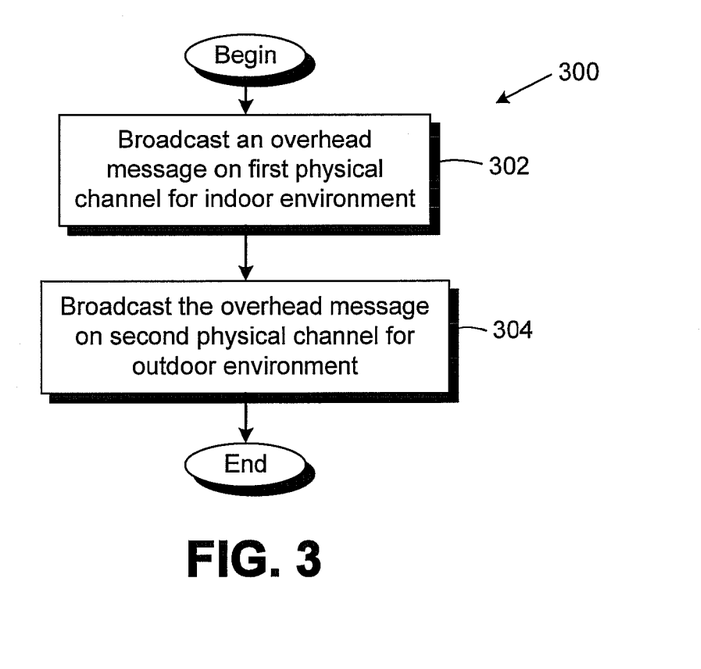
FIG. 3 is a flowchart illustrating a first method of broadcasting network overhead parameters in the communications system of FIG. 1.

FIG. 3 is a flowchart 300 illustrating a first method of broadcasting network overhead parameters in the communications system 100 of FIG. 1. With this method, overhead message channels are separate physical channels configured with different broadcast parameters to provide coverage in different channel environments. Specifically, the AN 102 broadcasts two or more pilot and control channels, each with a different set of broadcast parameters designed to support a different type of channel environment, e.g., the indoor environment 108 or the outdoor environment 110.

In the exemplary communications system 100, the AN 102 broadcasts a first pilot channel (PCh1) and a first control channel (CCh1) for users that are located outdoors (step 302). The AN 102 simultaneously broadcasts a second control channel (CCh2) for users who are fixed (or moving slowly) and located inside buildings (step 304). If CCh2 is transmitted on a separate antenna from CCh1, then the AN 102 will also transmit a second pilot channel (PCh2). A separate pilot PCh2 is typically needed if CCh2 uses a different set of antennas from CCh1 for transmission. The channels can be separated by assigning them different Walsh codes, for example.

The wireless mobile devices 104 monitor PCh1 and PCh2 using channel estimation to determine which channel should be monitored for overhead messages. In the case where CCh1 and CCh2 use the same set of antennas, then the wireless mobile device 104 could monitor PCh1 alone to make the decision.

Additionally or alternatively, a multi-mode wireless mobile device can be configured to presume that it is in a poor coverage area while it is receiving WLAN services. In poor coverage areas, the multi-mode wireless mobile device monitors CCh2 for overhead messages. Thus, with this configuration, the wireless mobile device is programmed to determine when it is receiving services on the WLAN. It can do this by detecting a handoff from the WWAN to the WLAN. Upon determining that it is receiving WLAN services, the wireless mobile device monitors and receives overhead messages on only CCh2 while receiving the WLAN service. Upon detecting a handoff between the WWAN and WLAN, the wireless mobile device switches between CCh1 and CCh2. Thus, upon detecting a handoff from the WLAN back to the WWAN, the wireless mobile device begins monitoring and receiving overhead messages on CCh1.

The pilot and control channel broadcast parameters can be set to according to the channel environments present in the WWAN coverage region 106 and the WWAN air interface technologies being used in the system 100. For example, in an OFDM based WWAN, for the outdoor environment 110, PCh1 and CCh1 pattern and format parameters can be set based on a root mean square (rms) of the delay spread on the order of 0.2 msec, high Doppler and fast fading. The conditions of the outdoor environment 110 require a specific code-rate, modulation order and cyclic-preamble length for the CCh1 patterns, length within frequency-time slots (FT-slots), and the like. PCh1 FT-slots size and pattern are also set specifically for the outdoor environment.

Conversely, PCh2 and CCh2 pattern and format parameters can be set based on a smaller delay spread (rms) and slower fading, for the indoor environment 108. The conditions of the indoor environment 108 require specific a code-rate, modulation order and cyclic-preamble length for CCh2, and PCh2 pilot pattern and size within FT-slots, and the like. These parameter settings are different from PCh1 and CCh1.

It is also possible to have different monitoring duty cycles for each environment. For example, a user who is located inside a building may prefer to monitor the PCh2, CCh2 at slower rate compared to a user monitoring PCh1, CCh1 who is outdoors in a car moving at 60 mph. The monitoring duty rate can be set at slower rate to save power.

Broadcasting two overhead message channels in the WWAN coverage region 106 has a number of advantages. The wireless mobile devices 104 located in the indoor environment 108 can use the WLAN for primary data services and the same time stay connected to WWAN by monitoring PCh2 and CCh2. This helps to provide seamless mobility because WWAN sync, timing, channel quality and availability information are continuously available to the wireless mobile devices 104 while indoors. This makes the transition from indoor to outdoor channel environments, and vice-versa, less likely to interrupt wireless service. The seamless transition from WLAN to WWAN may be requested by the wireless mobile device 104 or the WWAN or WLAN network. One of the most common methods is that the handoff request may be triggered by monitoring the relative signal strength between WLAN and WWAN, including the success of demodulating the overhead messages.

In addition, monitoring the PCh2 and CCh2 channels provides several additional benefits at minimal cost. For example, network administrative information can be broadcasted over CCh2. Most of this information does not require acknowledgements ACKs from the wireless mobile devices 104. This network administrative information can include software upgrades, location-based services, presence of other users, advertisements, and the like. The additional overhead message channel also facilitates faster WWAN call setup-time in the indoor environment 108, which is beneficial to emergency calls such as E911 services.

Figure 4:
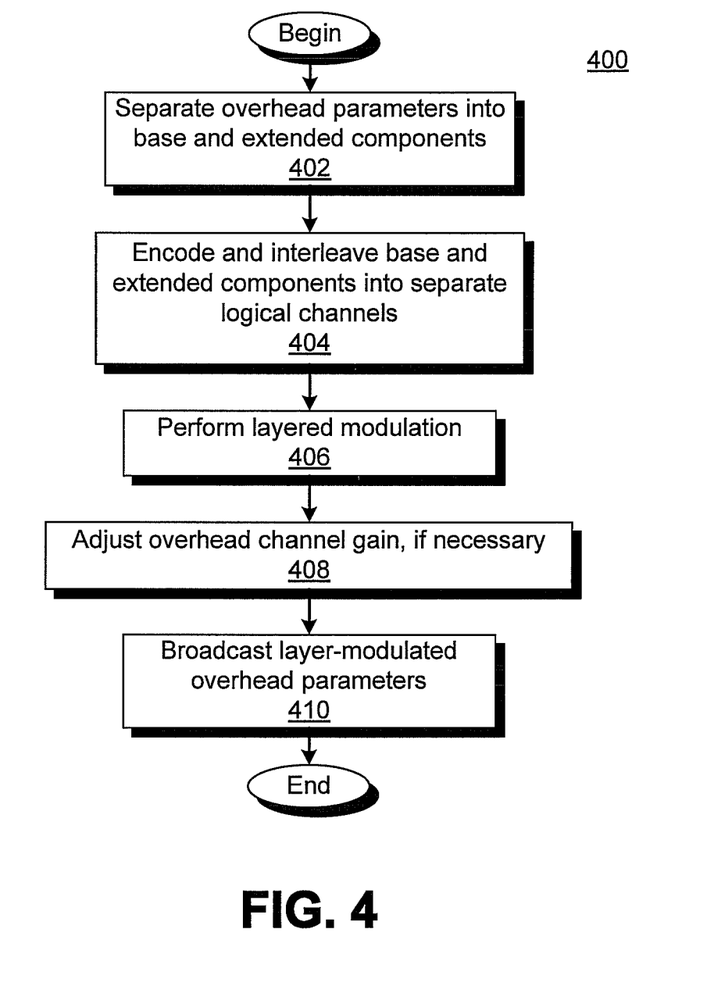
FIG. 4 is a flowchart illustrating a second method of broadcasting network overhead parameters in the communications system of FIG. 1.

FIG. 4 is a flowchart 400 illustrating a second method of broadcasting network overhead messages from the WWAN AN 102 to the wireless mobile devices 104 in the communications system 100. With this method, the overhead parameter information is segregated into base and extended components that are encoded onto separate logical channels and layer modulated. Using layered modulation, the wireless mobile devices 104 can receive base components in poor coverage regions. The base components include overhead parameters for acquiring a WWAN traffic channel, and the extended components include those overhead parameters for maintaining a WWAN traffic channel.

In step 402, the AN 102 divides the overhead messages into base and extended components. The base component includes critical parameters needed for the wireless mobile device 104 to quickly acquire the WWAN. Information included in the base component may include: synchronization and timing information, paging channel information, all relative parameter information to initiate a reverse link traffic channel, such as a reverse activity channel (RL interference level), list of preferred ANs, and the like.

The extended component includes the remaining parameters in the overhead messages that are deemed less critical for network acquisition. Information included in the extended component may include: reverse power control parameters (RL closed-loop), scheduling information, all the relative information to maintain a reverse link traffic channel, such as a neighboring sectors list, network parameters, and the like.

In step 404, the AN 102 constructs the base and extended components into two separate logical channels: the base channel and the extended channel. Each of these channels is independently encoded and interleaved by the AN 102. Any other processing on the base and extended components is also performed independently.

In step 406, the AN 102 multiplexes and then modulates the two channels using layered modulation. Layered quadrature amplitude modulation (QAM) is preferably used. Layered modulation supports the division of the overhead messages into two logical channels. Using layered modulation allows the wireless mobile devices 104 to demodulate the base component under poor channel conditions. Wireless mobile devices 104 in good coverage conditions (e.g., the outdoor environment 110) can demodulate both the base and the extended components with relative ease.

In step 408, the AN 102 adjusts the gain ($G_b$) for the base and extended channel, if necessary, such that the base logical channel can be demodulated successfully if the receiving wireless mobile device 104 can receive the pilot signal.

In step 410, both base and extended components are broadcasted, along with a pilot signal, by the WWAN AN 102 to the wireless mobile devices 104.

The broadcast method depicted in FIG. 4 has the advantage that a second overhead message physical channel is not needed. This reduces the amount of overhead for the WWAN and reduces or eliminates any interference due to the transmission of a second overhead channel. In addition, the method of FIG. 4 is especially useful in the outdoor-to-indoor environment where the wireless mobile devices 104 experience relatively high signal loss due to the loss from building penetration. However, in general, this method is useful in any environment where the channel condition is poor.

Typically in the outdoor-to-indoor environment, a wireless mobile device 104 is able to receive enough energy from the WWAN AN 102 to detect a pilot channel used for synchronization and channel estimation. However, the wireless mobile device 104 may not receive sufficient signal energy to demodulate conventional WWAN data channels, including the overhead messages sent over the broadcast channel. Splitting the overhead messages into the base and extended components and applying layered modulation to these components allows the wireless mobile device 104 to demodulate the critical base component at a much lower received signal level. The lower-order modulation on the base component is relatively more robust.

Figure 5:
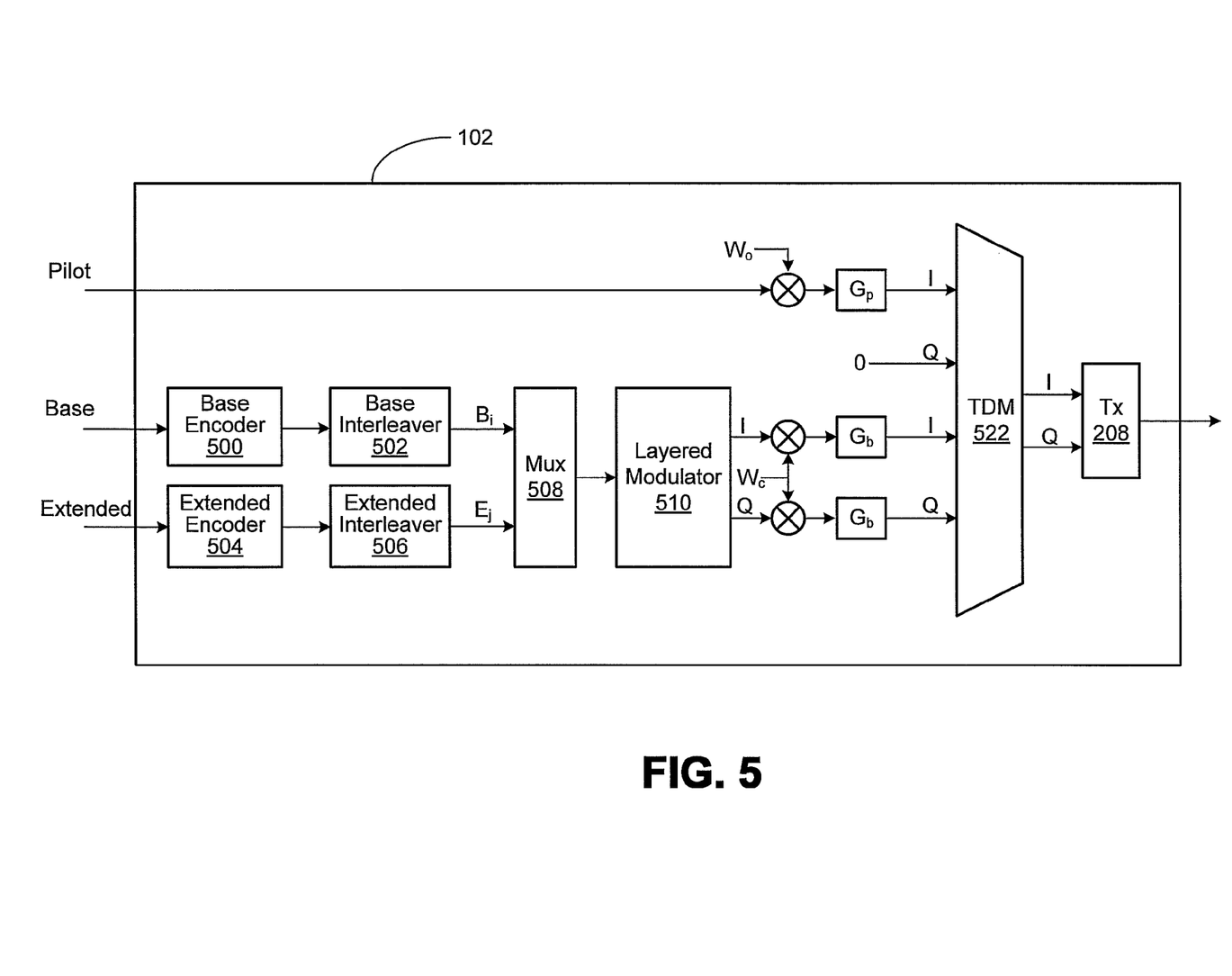
FIG. 5 is a diagram illustrating components of the access node for broadcasting network overhead parameters according to the method of FIG. 4.

FIG. 5 is a diagram illustrating components of the AN 102 for broadcasting network overhead messages according to the method of FIG. 4. The AN 102 includes a base component encoder 500 and interleaver 502, an extended component encoder 504 and interleaver 506, a multiplexer (Mux) 508, a layered modulator 510, Walsh-code ($W_0$, $W_C$) multipliers 512, 512, 518, for pilot and control channels respectively, gain multipliers 516, 520, time division multiplexer (TDM) 522 and the transmitter 208. The elements 500-522 of FIG. 5 can be implemented in the AN processor 202.

The encoders 500, 504 and interleavers 502, 506 provide error correction processing. The encoders 500, 504 may employ any suitable error correction coding, such as turbo coding, and the interleavers 502, 506 may employ any suitable interleaving algorithm. The encoding and interleaving schemes used by one logical channel may be different from those used by the other logical channel.

Figure 6:
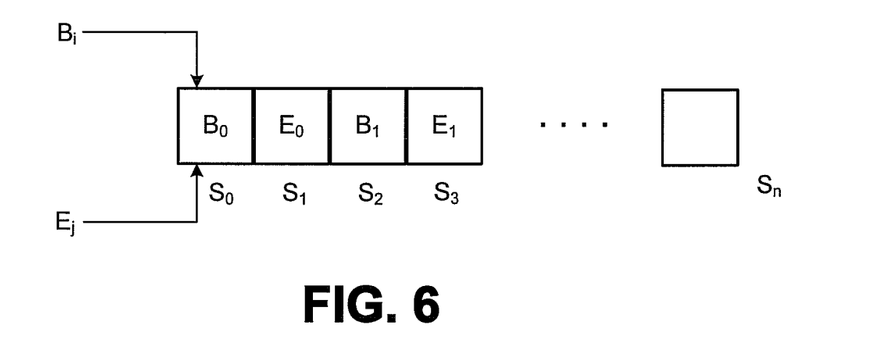
FIG. 6 is a conceptual diagram illustrating the multiplexing of the base and extended logical channels.
Figure 7:
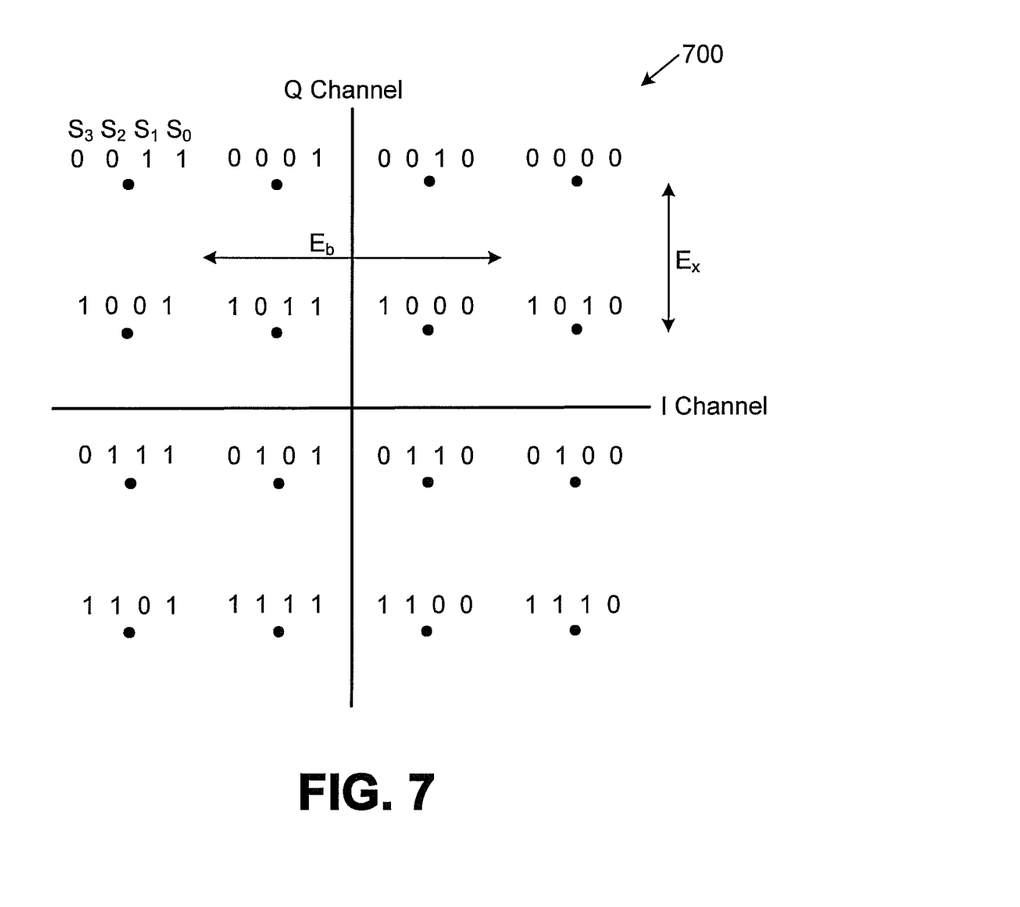
FIG. 7 shows an exemplary QAM constellation used by the layered modulator shown in FIG. 5.

FIGS. 5-7 essentially describe how the logical channels are mapped into the layered modulation symbols. As depicted in FIG. 5, each of the base and extended components are individually encoded and interleaved. The outputs of the logical channels $B_i$, $E_j$ are multiplexed by Mux 508, as depicted in FIG. 6. Depending on the number of parameters that make up the base component, the multiplexing may be varied. For example, instead of alternating the bits from each of the components for multiplexing, each base logical bit may be followed by three extended logical bits.

FIG. 7 shows an exemplary 16-QAM constellation 700 illustrating the layered modulation symbols produced by the layered modulator 510. In this example, each modulation symbol represents four multiplexed bits (i.e., S3, S2, S1, S0). The multiplexed bits from the base component are represented by S0 and S2, while the multiplexed bits from the extended component are represented by S1 and S3. The modulation symbols are constructed such that S0 and S2 do not change within the same quadrant. Therefore, the multiplexed bits from the base component are essentially QPSK modulated while the multiplexed bits from the extended component are 16-QAM modulated.

As shown in FIG. 5, the base and extended components are modulated and then transmitted along with a pilot signal. The pilot gain ($G_p$) is independent from the gain ($G_b$) for the base and extended logical channels.

To improve reception of the base components, the AN 102 can adjust the gain $G_b$ such that the base logical channel can be demodulated successfully if the receiving wireless mobile device 104 successfully receives the pilot signal.

To additionally improve reception of the base components, the AN 102 can also adjust the energy level of the 16-QAM modulation symbols, as shown in FIG. 7, to favor the base component. This is done by increasing the distance between the centers of each quadrant ($E_b$) relative to the distance between the modulation symbols within a quadrant ($E_x$).

Figure 8:
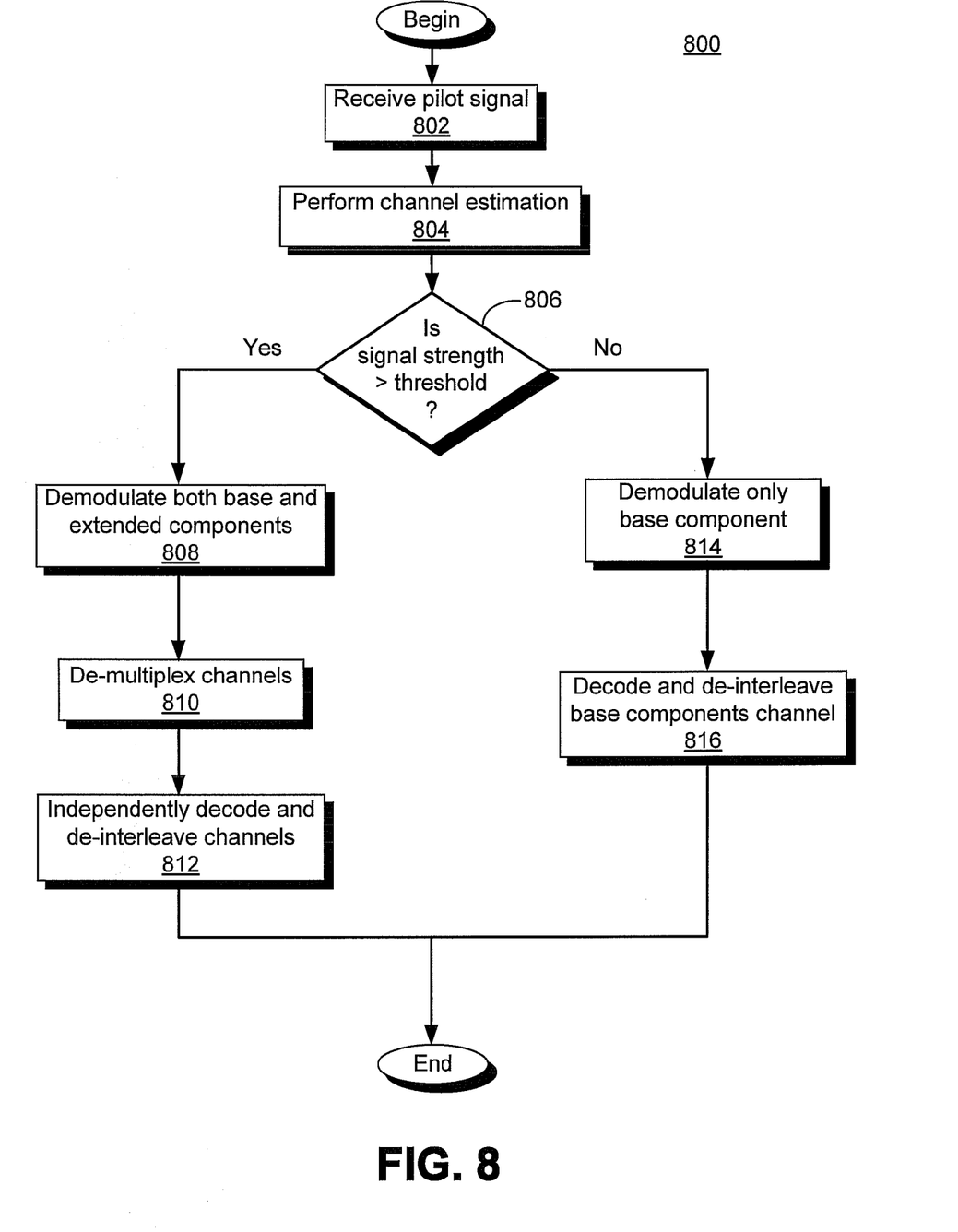
FIG. 8 is a flowchart illustrating a method of recovering broadcasted overhead parameter at a wireless mobile device.

FIG. 8 is a flowchart 800 illustrating a method of recovering broadcasted overhead parameters at one of wireless mobile devices 104. In step 802, the wireless mobile device 104 receives a pilot signal from the AN 102. In step 804, the wireless mobile device 104 performs a channel estimation by determining the strength of the pilot signal using a conventional network parameter, such as the carrier-to-interference ratio (C/I). In decision step 806, the pilot signal strength is compared to a threshold (TH$_{C/I}$). If the pilot signal strength is above TH$_{C/I}$, then the wireless mobile device 104 proceeds to de-modulate, de-multiplex, decode and de-interleave both the base and extended components (steps 808-812) of the overhead message. If not, the wireless mobile device 104 demodulates, decodes and de-interleaves only the base component (steps 814-816).

Alternatively, the wireless mobile device 104 may monitor broadcasted signal strength and attempt to recover the broadcasted overhead message without a threshold comparison. In this case, the wireless mobile device 104 demodulates both the base and extended components at all times. The base and extended components may indicate successful recovery of the overhead messages depending on the outcome of error checking, e.g., the CRC (cyclic redundancy check) or equivalent, for each of the components.

In either case, the wireless mobile device 104 can be a multi-mode device that is receiving services over the WLAN while at the same time monitoring and receiving the WWAN overhead messages using the method of FIG. 8.

Additionally or alternatively, a multi-mode wireless mobile device can be configured to presume that it is in a poor coverage area while it is receiving WLAN services. In poor coverage areas, the multi-mode wireless mobile device monitors and demodulates only the base channel. Thus, with this configuration, the wireless mobile device is programmed to determine when it is receiving services on the WLAN. It can do this by detecting a handoff from the WWAN to the WLAN. Upon determining that it is receiving WLAN services, the wireless mobile device monitors and receives overhead parameters on only the base channel while receiving the WLAN service. Upon detecting a handoff between the WWAN and WLAN, the wireless mobile device switches between demodulating only the base channel and demodulating both the base and extended channels. Thus, upon detecting a handoff from the WLAN back to the WWAN, the wireless mobile device begins demodulating and receiving overhead parameters on both the base and extended channels.

Figure 9:
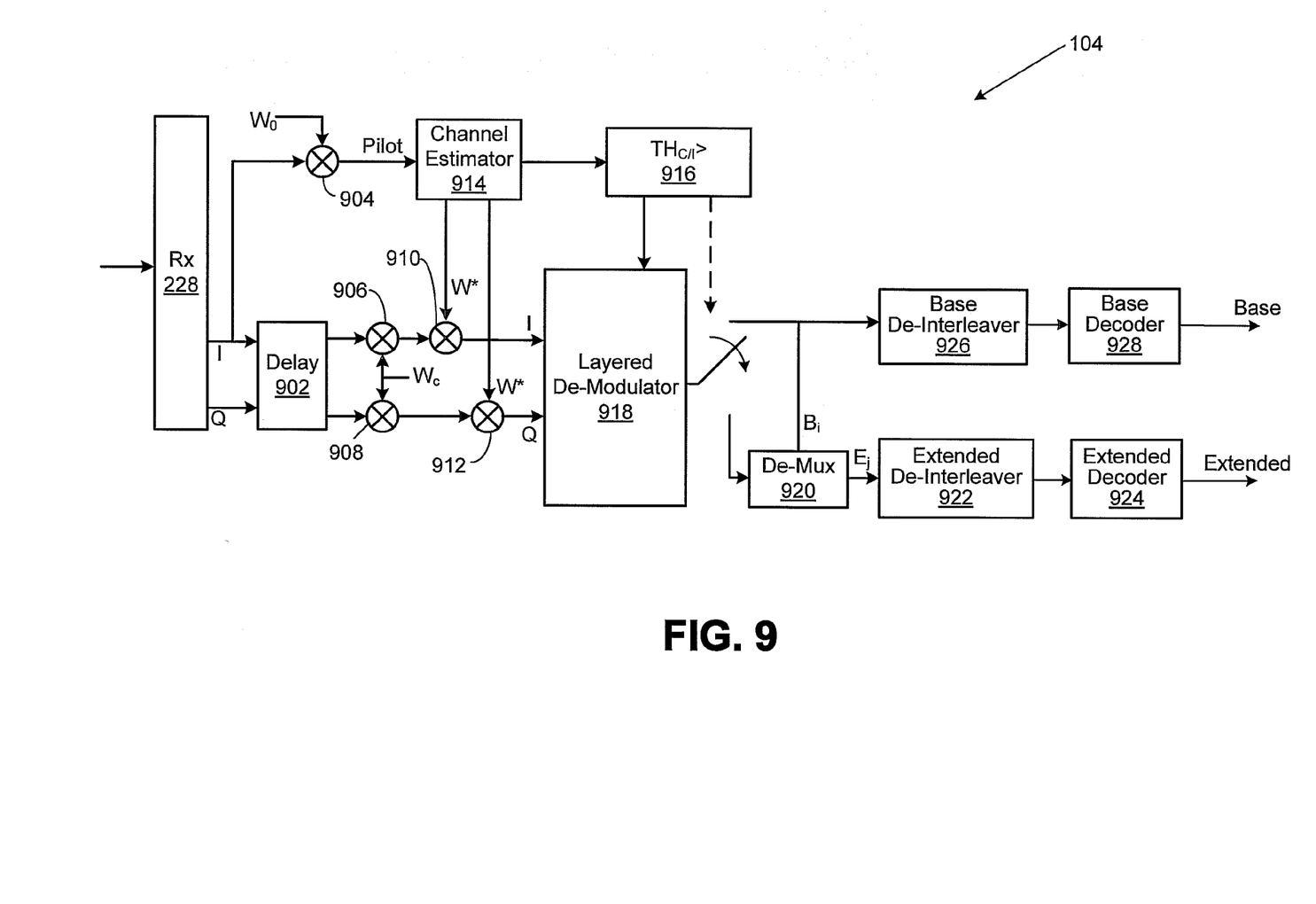
FIG. 9 is a diagram illustrating components of a wireless mobile device for recovering broadcasted overhead parameters.

FIG. 9 is a diagram illustrating components of the wireless mobile device 104 for recovering broadcasted overhead parameters. The components shown in FIG. 9 allow the wireless mobile device 104 to receive at least partial information in WWAN control channels by demodulating the base component. The wireless mobile device 104 includes the receiver 228, a delay buffer 902, Walsh-code (W$_0$, W$_C$) and coefficient (W*) multipliers 904, 906, 908, 910, 912, channel estimator 914, threshold comparator 916, layered demodulator 918, de-multiplexer 920, base component de-interleaver 926 and decoder 928, and extended component de-interleaver 922 and decoder 924. The elements 902-928 shown in FIG. 9 can be implemented in the wireless mobile device processor 220.

The channel estimator 914 provides a signal strength, C/I, to the threshold comparator 916, which determines the QAM modulation order to be used by the layered demodulator 918. The threshold comparator 916 can include one or more look-up tables (LUTS) to store signal-to-noise ratio (SNR) ranges and corresponding modulation order values. The LUTs for the SNR may be updated depending on the relative levels of the pilot gain (G$_p$) and the gain used in the base logical component, since the pilot level transmitted may change depending on traffic conditions. The LUTs may also contain code-rate information. If the threshold comparator 916 indicates that SNR is sufficient, both base and extended components can be demodulated successfully using the 16-QAM demodulator.

However, if the threshold comparator 916 indicates a low SNR, it is possible that only the base component can be successfully demodulated. In this case, for each received 16-QAM symbol, the layered demodulator 918 only needs to determine in which quadrant the symbol has the least probability of error. Instead of choosing among the sixteen possible 16-QAM symbols, the layered demodulator 918 only needs to make a decision based on four possible outcomes (similar to QPSK demodulation). This is possible because the modulation symbol for each quadrant does not change with respect to the base component bits.

A third method of broadcasting overhead messages entails using different encoding schemes on the base and extended components, instead of layered modulation, to improve the level of error correction for the base component. As in the second broadcast method illustrated by FIG. 4, the AN 102 divides the overhead messages into base and extended components. These components form two logical channels. Each logical channel uses its own encoding and interleaving. However, in this alternative method, the base logical channel uses a more robust encoding scheme (e.g., turbo coding using rate 1/5), while the extended logical channel uses a less robust encoding scheme (e.g., turbo coding using rate 1/3). The 1/5 coding increases redundancy at the expense of lowered information bit rate. This allows greater level of error correction than the rate 1/3 turbo code. Similarly, interleaving parameters can be changed according to fading conditions (e.g., fast fading in outdoor environments and slow fading in indoor environment). With the built in differences in code rate, the two logical channels can be multiplexed and modulated without using layered modulation.

Although a particular communications system 100 is specifically described above, the methods and systems described herein are applicable to any suitable communications system architecture or air interface technology (e.g., CDMA, OFDMA, and the like). Basic radio system parameters and call processing procedures for exemplary CDMA WWAN systems that can incorporate the systems and methods described herein are described in a TIA specification, entitled "Mobile Station-Base Station Compatibility Standard for Dual-Mode Wideband Spread Spectrum Cellular System," TIA/EIA/IS-95-A, published in May 1995 by the Telecommunications Industry Association, and referred to hereafter as "IS-95A". The update and revision to IS-95A and J-STD-008 (PCS specification analogous to IS-95A) is TIA/EIA/IS-95-B, first published in March 1999 by the TIA and referred to hereafter as "IS-95B". The IS-95A and IS-95B specifications are jointly known as second generation or "2G" CDMA system specifications. A third generation or "3G" CDMA system is described in the TIA specification, entitled "cdma2000 Series", TIA/EIA/IS-2000-A, first published in March 2000 by the TIA, and referred to hereafter as "IS-2000". Other TIA air interface specifications for the cdma2000 family of standards include TIA-856 entitled "cdma2000 High Rate Packet Data Air Interface Specification" as well as TIA-1121 entitled "Ultra Mobile Broadband Air Interface Specification. The IS-95A, IS-95B, IS-2000 and other TIA specifications mentioned above, and their updates are hereby incorporated by reference for their teachings on CDMA communication systems.

Other embodiments and modifications of this invention will occur readily to those of ordinary skill in the art in view of these teachings. The above summary and description is illustrative and not restrictive. The invention is to be limited only by the following claims, which include all such embodiments and modifications when viewed in conjunction with the above specification and accompanying drawings. The scope of the invention should, therefore, not be limited to the above summary and description, but should instead be determined by the appended claims along with their full scope of equivalents.

What is claimed is:

1. A wireless communications system, comprising:
an access node configured to broadcast a first overhead message on a first channel for covering a first channel environment within a coverage region and a second overhead message on a second channel for covering a second channel environment within the coverage region.

2. The wireless communications system of claim 1, wherein the first channel has a first set of predetermined parameters selected to support the first channel environment and the second channel has a second set of predetermined parameters selected to support the second channel environment.

3. The wireless communications system of claim 1, wherein the predetermined parameters are selected from the group consisting of code-rate, interleaving parameters, modulation order, control channel cyclic-preamble length, pilot channel patterns within frequency-time slots, pilot channel length with frequency-time slots, and any suitable combination of the foregoing.

4. The wireless communications system of claim 1, wherein the first and second channels are first and second broadcast control channels, respectively, and the access node also broadcasts a first pilot channel corresponding the first broadcast control channel and a second pilot channel corresponding to the second broadcast control channel.

5. The wireless communications system of claim 1, wherein the first and second overhead messages include identical overhead information.

6. The wireless communications system of the claim 1, wherein a network overhead message consists of a first component and a second component, and the first overhead message includes the first component and the second overhead message includes the second component.

7. The wireless communications system of claim 6, wherein the first overhead message includes overhead information for a wireless mobile device to acquire a traffic channel and the second overhead message includes overhead information for the wireless mobile device to maintain the traffic channel.

8. The wireless communications system of claim 7, wherein the overhead information in the first overhead message is selected from the group consisting of: synchronization information, timing information, information for initiating a reverse link traffic channel, paging channel information, and any suitable combination of the foregoing.

9. The wireless communications system of claim 7, wherein the overhead information in the second overhead message is selected from the group consisting of: reverse link power control information, traffic channel scheduling information, a neighboring section list, network parameters, paging information, and any suitable combination of the foregoing.

10. The wireless communications system of claim 1, wherein the first and second channels are two separate logical channels.

11. The wireless communications system of claim 10, wherein the access node comprises:

a first encoder and a first interleaver for encoding and interleaving, respectively, the first overhead message onto the first channel; and
a second encoder and a second interleaver for encoding and interleaving, respectively, the second overhead message onto the second channel.

12. The wireless communications system of claim 11, wherein the first encoder is more robust than the second encoder.

13. The wireless communications system of claim 11, wherein the access node further comprises:
a multiplexer for multiplexing the first and second channels; and
a layered modulator for modulating the multiplexed first and second channels.

14. The wireless communications system of claim 13, wherein the layered modulator includes a QAM modulator configured to output modulation symbols representing bits on the first and second channels where the bits representing the first channel do not change within the same quadrant of the QAM constellation of the QAM modulator.

15. The wireless communications system of claim 13, wherein the access node includes:
a transmitter for transmitting a pilot signal, the first channel and the second channel; and
means for adjusting a gain of the first channel such that a wireless mobile device successfully demodulating the pilot signal also successfully demodulates the first channel.

16. The wireless communications system of claim 1, further comprising a wireless mobile device, comprising:
a receiver for receiving a first channel and the second channel;
means for monitoring signal strength of a channel broadcasted from the access node; and
a demodulator for selectively demodulating the first channel or the second channels based on the signal strength.

17. The wireless communications system of claim 16, wherein the first channel has a modulation order that is lower than a modulation order of the second channel.

18. The wireless mobile device of claim 17, wherein the first overhead message includes overhead information for permitting the wireless mobile device to acquire a wireless wide area network WWAN channel and the second overhead message includes overhead information for permitting the wireless mobile device to maintain the WWAN channel.

19. The wireless mobile communications system of claim 16, wherein the wireless mobile device, further comprises:
means for determining when a wireless local area network (WLAN) service is being received by the wireless mobile device; and
means for monitoring the first channel while receiving the WLAN service.

20. The wireless mobile device of claim 16, wherein the wireless mobile device further comprises:
means for detecting a handoff between the WWAN and a wireless local area network (WLAN); and
means for switching between the first channel and the second channel upon detecting the handoff.

21. A method for sending overhead information from an access node to a wireless mobile device in a coverage region comprising a first channel environment and a second channel environment, the method comprising:
broadcasting a first overhead message including at least portion of the overhead information on a first channel for covering the first channel environment; and broadcasting a second overhead message including at least portion of the overhead information on a second channel for covering the second channel environment.

22. The method of claim 21, further comprising:
interleaving the first overhead message onto the first channel using a first interleaver; and
interleaving the second overhead message onto the second channel using a second interleaver.

23. The method of claim 21, further comprising:
multiplexing the first and second channels; and
modulating the multiplexed first and second channels using a layered modulation scheme.

24. The method of claim 23, wherein the step of modulating includes:
outputting QAM modulation symbols representing bits on the first and second channels where the bits representing the first channel do not change within the same quadrant of the QAM constellation.

* * * * *